United States Patent [19]

Radke et al.

[11] 4,131,300

[45] * Dec. 26, 1978

[54] INFLATOR FOR AUTOMOBILE SAFETY DEVICE

[75] Inventors: Donald G. Radke, Rochester; Donald J. Lewis, Troy, both of Mich.

[73] Assignee: Allied Chemical Corporation, Morris Township, Morris County, N.J.

[*] Notice: The portion of the term of this patent subsequent to Aug. 26, 1992, has been disclaimed.

[21] Appl. No.: 537,497

[22] Filed: Dec. 30, 1974

Related U.S. Application Data

[63] Continuation of Ser. No. 376,866, Jul. 5, 1973, abandoned.

[51] Int. Cl.$^2$ ............................................. B60R 21/00
[52] U.S. Cl. ..................................... 280/737; 280/741
[58] Field of Search ................ 280/150 AB, 734, 736, 280/737, 740, 741; 222/3

[56] References Cited

U.S. PATENT DOCUMENTS

| | | | |
|---|---|---|---|
| 3,642,304 | 2/1972 | Johnson | 280/150 AB |
| 3,649,045 | 3/1972 | Smith | 280/150 AB |
| 3,655,217 | 4/1972 | Johnson | 280/150 AB |
| 3,687,213 | 8/1972 | Sato | 280/150 AB |
| 3,715,131 | 2/1973 | Hurley | 280/150 AB |
| 3,721,456 | 3/1973 | McDonald | 280/150 AB |
| 3,901,530 | 8/1975 | Radke | 280/150AB |

Primary Examiner—Robert B. Reeves
Assistant Examiner—H. Grant Skaggs
Attorney, Agent, or Firm—Ernest D. Buff

[57] ABSTRACT

A method and apparatus compact enough for use in locations, such as in the steering wheel column of a vehicle for inflating a safety device, such as a bag. A stored compressed gas from a stored gas chamber is mixed in a mixing chamber with a combustion gas from a gas generating chamber. A combustion gas barrier between the gas generating chamber and the mixing chamber is designed to rupture when the heat and pressure in the gas generating chamber exceeds a maximum temperature and pressure, allowing combustion gas from a combustible material in the gas generating chamber to flow into the mixing chamber. A hybrid gas barrier between the mixing chamber and an outlet means is designed to rupture when the heat and pressure in the mixing chamber exceeds the maximum temperature and pressure, allowing the gas mixture to flow from the mixing chamber through an outlet means to inflate the safety bag. A strainer disposed between the gas generating chamber and the combustion gas barrier prevents the passage of most of the combustion residue resulting from combustion of the combustible material from the gas generating chamber to the mixing chamber. The gas generating chamber is separate from and outside of the stored gas container, as a result of which the transfer of heat from the combustible material and the combustion gas to the stored gas chamber is minimized.

3 Claims, 5 Drawing Figures

INFLATOR FOR AUTOMOBILE SAFETY DEVICE

This is a continuation, of Application Serial No. 376,866 filed July 5, 1973 now abandoned.

BACKGROUND OF THE INVENTION

This invention is directed to a method and apparatus for inflating a safety device, such as a safety bag adapted for use in a transport vehicle. More specifically, this invention is directed to an improved miniaturized system adapted for use in locations where space is limited, such as in a steering wheel column of an automobile and employing a mixture of a stored compressed gas and a generated gas. Still more specifically, this invention is directed to a simplified method and apparatus in which the gas generating chamber is separate from, outside of and partially contiguous with the stored gas chamber.

The prior art reveals various methods and apparatus for using inflatable gas bags as a safety device to be employed in motor vehicles for the purpose of restraining passengers during impact in order to prevent serious injuries. Such gas inflatable safety bags have been proposed either as an alternative or as adjunct to seat belts which are employed in automobiles.

Although seat belts provide protection against serious injuries during automobile impact, seat belts are often not used. In order to overcome this failure to use seat belts and to provide protection to the motor vehicle driver and/or passengers without requiring any voluntary act on their part, the automobile industry has been developing gas inflated safety bags. One or more gas inflated safety bags are stored in the automobile and are actuated upon impact automatically. Such actuation causes the safety bag to be inflated with a gas instantaneously. Inflation of the safety bag restrains the automobile occupants in their seats during the critical moments following impact and helps to prevent serious injury.

The safety bags are inflated by means of a generated gas or a mixture of stored and generated gases which are under pressure and which are expanding in volume. Since the volume, according to Charles' Law, and the pressure, according to Gay-Lussac's Law, of an ideal gas vary directly with the absolute temperature of the gas, it is desirable to conserve the heat developed during generation of the gas so that such heat can be directed toward raising the temperature of the gas rather than being dissipated throughout the system and wasted. While there are other considerations regarding the heat developed by the generated gas, viewed from the standpoint of efficient use of gas volume and pressure, the less heat that is diffused and wasted throughout the system, the better, particularly where a miniaturized inflator is needed.

In some prior art designs, the gas used to inflate the safety bag is commonly a hybrid gas which results from mixing a stored gas from a pressurized container and a generated gas resulting from combustion of a pyrotechnic material in a gas generating chamber which is commonly disposed within the stored gas container. Location of the gas generating chamber within the stored gas chamber results in some amount of heat being transferred to and dissipated in the stored gas chamber and its outer casing. In other prior art designs, the generated gas or the hybrid gas passes through the stored gas chamber on its way to the safety bag, resulting in a transfer of heat to the casing of the stored gas chamber.

Many of the inflator devices known in the prior art are relatively large in size which prevents them from being installed in small locations, such as in the steering column adjacent to the steering wheel in an automobile and, instead, requires that they be located under the hood in the engine compartment of the automobile.

In some prior art designs, the stored gas chamber or the reservoir of pressurized gas and/or the gas generating chamber are physically remote from the inflatable safety bag, necessitating a series of conduits to connect the stored gas chamber and the gas generating chamber to the safety bag. What is needed is an improved design of inflator which allows the inflator to be sufficiently miniaturized in size so that the inflator can be located adjacent to the safety bag, thereby eliminating such conduits. Since the safety bag must, in turn, be located adjacent to the occupants of the vehicle, either driver or passenger, or both, this means that the inflator must be sufficiently miniaturized in size to be located in the passenger compartment of the automobile or adjacent to the passenger compartment of the automobile.

In some prior art designs, the combustion by-products and residue of the pyrotechnic material are allowed to pass into the stored gas chamber after combustion of the pyrotechnic material. This is undesirable because it contaminates the stored gas chamber with such combustion residue and may also contaminate the hybrid gas flowing into the safety bag.

U.S. Pat. 3,674,059 to Stephenson discloses apparatus for inflating a safety bag in which the gas generating chamber is physically positioned within the stored gas chamber.

U.S. Patent 3,663,036 to Johnson discloses a design in which some or all of the hot gas from the gas generating chamber is deflected through the stored gas chamber on its way to the safety bag.

U.S. Patent 3,642,304 to Johnson discloses a design in which the stored gas chamber and the gas generating chamber are connected to the safety bag by a series of conduits.

Other prior art of interest include U.S. Patents 3,655,217 to Johnson and 3,122,181 to Hebenstreit.

SUMMARY OF THE INVENTION

It is an object of this invention to provide an arrangement in which heat is conserved for the purpose of facilitating expansion of the gas flowing to the safety bag and for the purpose of minimizing the diffusion of heat to other areas, such as to the stored gas container. It is another object of this invention to minimize passage of the combustion gas and residue by-products from the combustible pyrotechnic material to other areas of the apparatus, such as to the stored gas chamber. It is an additional object of this invention to provide a miniaturized design of an apparatus and a simplified method for inflating a safety bag with gas, an apparatus which is compact enough to be installed within the steering column of an automobile.

The apparatus of this invention comprises: a first chamber, called a stored gas chamber, adapted to be filled with a stored compressed gas; a second chamber, called a gas generating chamber, adapted to contain a combustible material for generating a gas; an actuating means; a third chamber, called the mixing chamber, in communication with the first chamber in which third chamber the stored gas and the generated gas are mixed to form a hybrid gas for inflating the safety device; a first barrier means disposed between the third chamber and the second chamber for preventing the stored compressed gas from entering the second chamber from the third chamber prior to actuation; an outlet means disposed between and adjacent to the third chamber and the safety device, through which outlet means the hybrid gas passes to the safety device; and second barrier means disposed between the third chamber and the outlet means to prevent the stored compressed gas from entering the outlet means from the third chamber prior to actuation.

The method of this invention comprises filling a stored gas zone with a compressed gas; firing a combustible pyrotechnic material disposed in a gas generating zone; releasing the generated combustion gas from the gas generating zone to a mixing zone; mixing the combustion gas with the compressed stored gas in the mixing zone; and releasing the mixed gases directly to an outlet means in communication with the inflatable safety bag. The combustion gas passes directly from the gas generating zone to the mixing zone and then directly from the mixing zone to the outlet means and to the safety bag.

DETAILED DESCRIPTION

Apparatus

Figure 1:
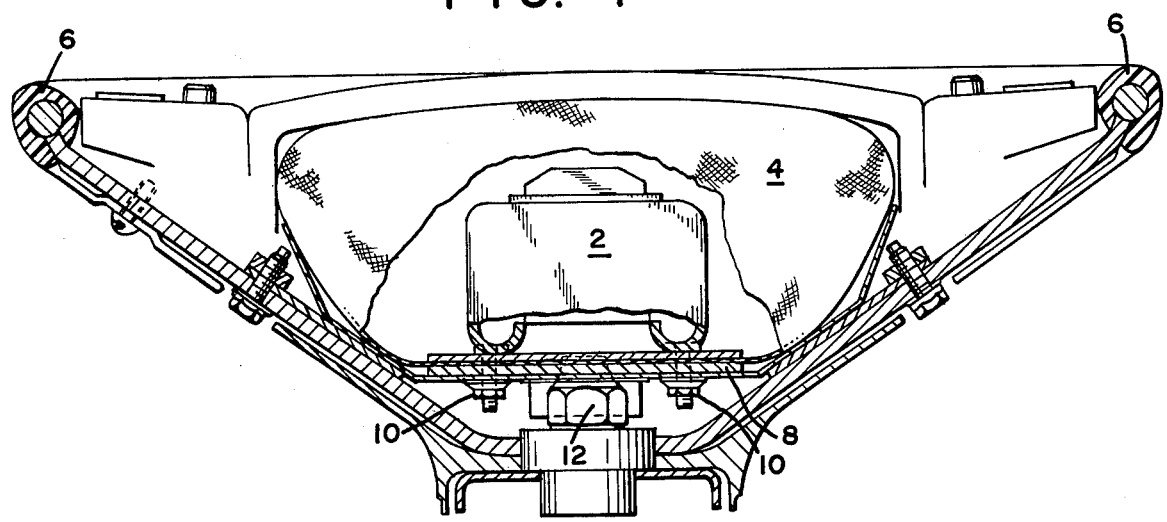
FIG. 1 is a side plan view of the inflator of this invention installed in the steering wheel column of an automobile, showing the safety bag in its packed position before inflation.
Figure 3:
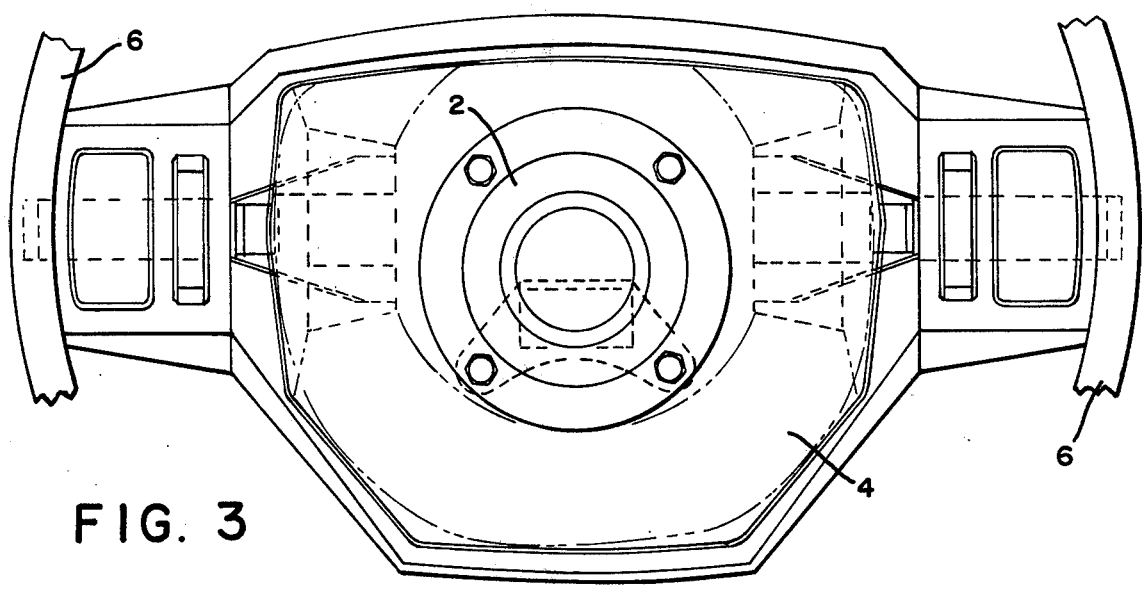
FIG. 3 is a frontal plan view of FIG. 1, showing the inflator of this invention installed in the steering wheel column of an automobile.

Referring to FIGS. 1 and 3, the apparatus of this invention is an improved inflator which is indicated generally by the numeral 2. It has the general shape of a canister and is designed to inflate at least one safety device, such as a flexible, inflatable, cushion bag 4.

The inflator 2 and the safety bag 4 are adapted for use, such as in an automobile or other vehicle, for the purpose of protecting the occupants, either the driver or passenger, or both, in the event of a dangerous situation, such as a collision. The improved design of this inflator 2 allows it to be miniaturized in size, as compared to inflators known in the prior art. Such miniaturization allows the inflator 2 and safety bag 4 to fit in a relatively small space, such as within the steering column adjacent to the steering wheel 6 of an automobile.

Figure 2:
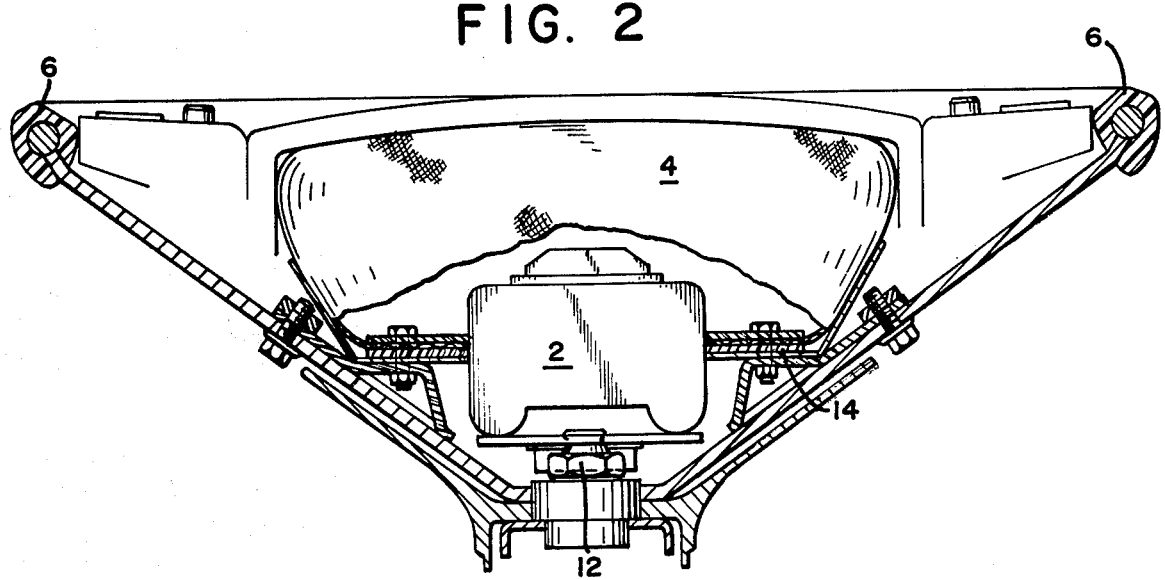
FIG. 2 is another side plan view of the inflator of this invention showing the safety bag in a slightly different position with reference to the inflator within the steering wheel column of an automobile.

The safety bag 4, as shown in FIG. 1, is in its packed configuration prior to inflation. The inflator 2 of this invention is also adapted to be located in other locations within an automobile, particularly because of its small size. Thus, FIGS. 1, 2 and 3 showing the inflator 2 in the steering column, are merely illustrative of one of many locations within an automobile where it may be located. The inflator 2 and its associated safety bag may also be used in other vehicles, such as trucks or airplanes. The inflator 2 may also be used in conjunction with more than one safety bag. The inflator 2 may also be used for the inflation of other devices, in addition to safety bags.

The inflator 2 may be positioned within the safety bag 4, as shown in FIG. 1, or the inflator 2 may be positioned partially outside of the safety bag 4, as shown in FIG. 2. The safety bag 4 may be attached to the inflator by arranging a portion of the safety bag 4, such as the ends of the mouth of the safety bag 4 between the mounting plates 8. When the mounting plates 8 are squeezed together by bolt 10, the mounting plates 8 firmly hold the safety bag 4. Other means may also be used to connect the safety bag 4 to the inflator 2. In the configuration shown in FIG. 2, the inflator 2 is provided with mounting plates 14 to which the packed safety bag 4 is affixed. The inflator 2 is affixed to the steering column by means of bolt 12.

Figure 4:
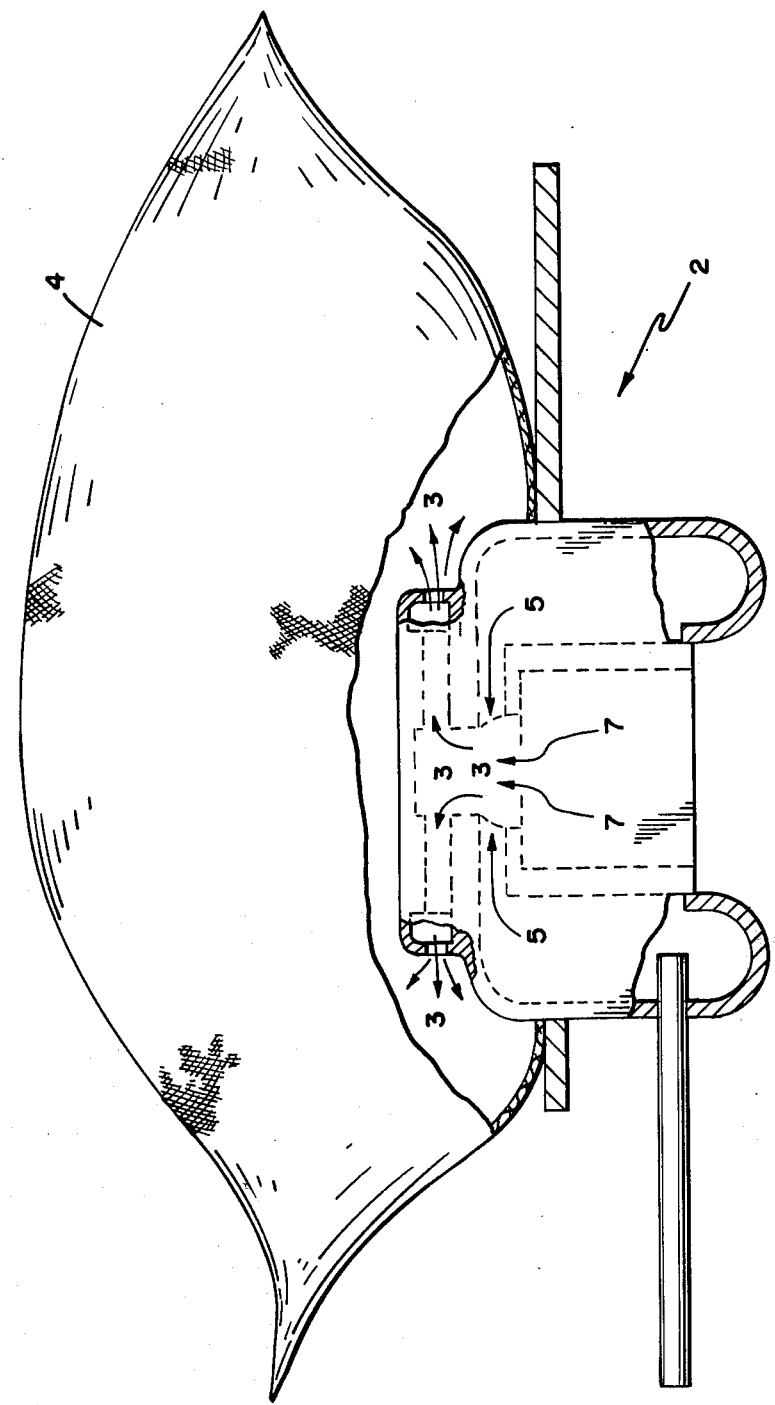
FIG. 4 is a side plan view of the inflator of this invention and its associated safety bag prior to inflation.

Referring to FIG. 4, the gas provided by inflator 2 to inflate the safety bag is a hybrid gas 3 comprised of two gas components: a stored compressed gas 5 and a generated combustion gas 7 which acts as a propellant.

Figure 5:
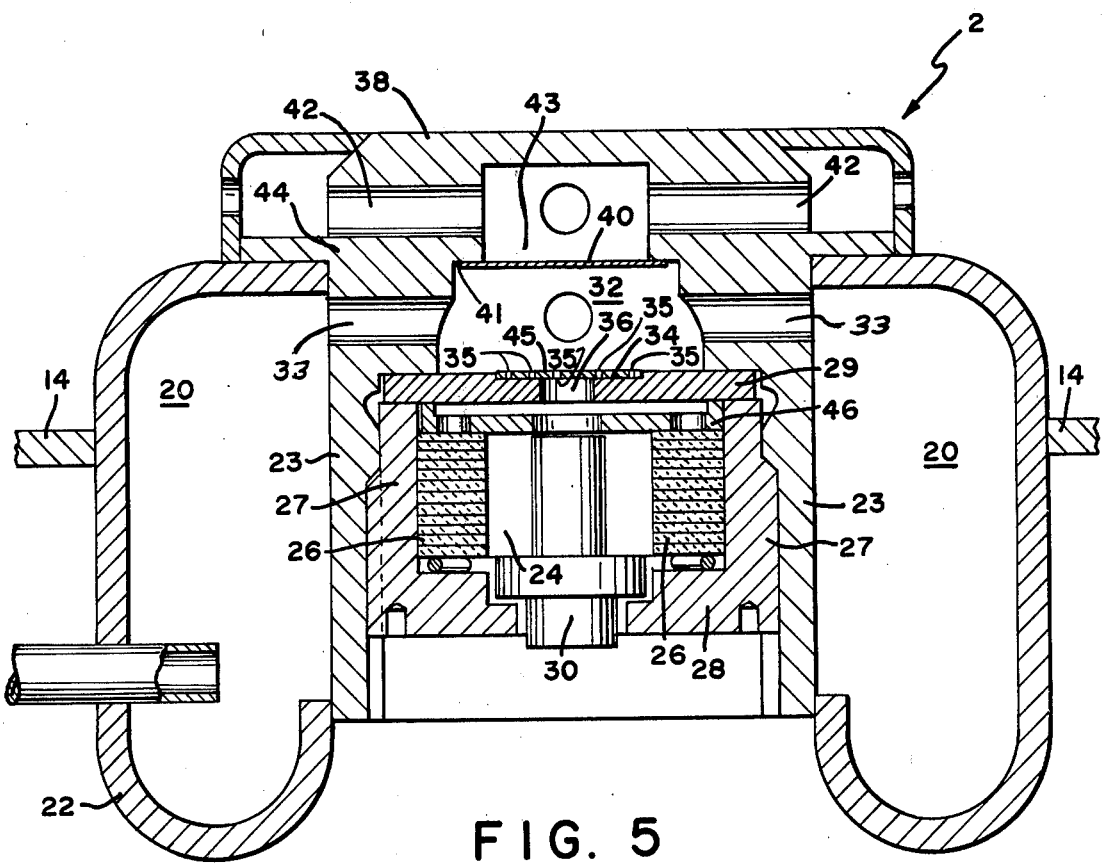
FIG. 5 is an enlarged cross-sectional view of the inflator of this invention.

Referring to FIG. 5, the enclosed stored gas chamber 20 is adapted to be filled with the stored gas under pressure. The stored gas may be argon under a pressure in the range from 2,000 to 3,600 pounds per square inch gage, such as 3,600 pounds per square inch gage. The stored gas chamber 20 is an integral part of the canister-shaped inflator 2. The stored gas chamber 20 has an outer wall 22 and has a generally toroidal shape. The stored gas chamber 20 is disposed around the outer perimeter of the inflator 2.

An enclosed gas generating chamber 24 is adapted to contain a combustible pyrotechnic material 26 which upon combustion generates a high pressure, hot combustion gas, known as the propellant gas or as the generated gas, in the gas generating chamber 24. As an example, the combustible pyrotechnic material 26 may be that disclosed in U.S. Patent Application Serial No. 224,524, entitled "Pyro-Technic Formulation", filed in the name of Brian K. Hamilton on February 8, 1972. The gas generating chamber 24 is adjacent to, preferably partially contiguous with, but separate from, the stored gas chamber 20. The gas generating chamber 24 is disposed in the approximate center of the inflator 2 in a configuration in which the gas generating chamber is surrounded by the stored gas chamber 20. Yet, since both the stored gas chamber 20 and the gas generating chamber 24 are separate and closed chambers, the gas generating chamber 24 is actually outside of the stored gas chamber 20. One practical advantage of having the enclosed stored gas chamber 20 separate from the gas generating chamber 24 is that the gas generating chamber 24 need not withstand high pressure prior to activation of the inflator 2, whereas the stored gas chamber 20 is under pressure.

The gas generating chamber 24 is also adapted to contain an actuating means, such as a squib 30, which is used to ignite the combustible pyrotechnic material 26, thereby causing combustion of the pyrotechnic material 26. Combustion of this pyrotechnic material 26 generates a high pressure combustion gas in the gas generating chamber 24 and this high pressure combustion gas acts as a propellant. Squib 30 is mounted in the bottom wall 28 of the gas generating chamber 24 in communication with the exterior of the inflator 2 and with the pyrotechnic combustible material 26 within the gas generating chamber 24. The squib 30 is adapted to be ignited under conditions such as impact of the automobile and to ignite the combustible material, in turn. This may be accomplished by known means, such as by use of a sensor (not shown) which sends an electrical current to the squib 30 through electrical wires (not shown) attached to the squib 30.

The squib 30 may be disposed in the approximate center of the gas generating chamber 24 with the pyrotechnic combustible material 26 disposed in the outer periphery of the gas generating chamber 24 around the squib 30. The pyrotechnic combustible material 26 may be in the form of separate discs having a separator means disposed between adjacent discs to facilitate quick, uniform combustion of the pyrotechnic combustible material 26.

A mixing chamber 32 is disposed, preferably, in the approximate center of inflator 2. The mixing chamber 32 is in open communication with stored gas chamber 20 through passageway 33. Hence, stored compressed gas is present in the mixing chamber 32 prior to actuation of the inflator 2. The stored compressed gas from the stored gas chamber 20 and the generated combustion gas from the gas generating chamber 24 are mixed in the mixing chamber 32 to form a hybrid gas adapted for inflating the safety bag. The mixing chamber 32 is adjacent to, and preferably partially contiguous with, but separate from, the gas generating chamber 24 and the stored gas chamber 20.

A separate, removable heat and pressure-sensitive combustion gas barrier 34 is disposed between the mixing chamber 32 and the gas generating chamber 24. Prior to actuation of the inflator 2, the combustion gas barrier 34 covers and blocks passageway 36 and prevents the stored compressed gas from entering the gas generating chamber 24 prior to actuation of said combustible material 26. Subsequent to actuation of the inflator 2, the combustion gas barrier 34 is adapted to act as a primary barrier with reference to the generated combustion gas from the gas generating chamber 24. The combustion gas barrier 34 is adapted to rupture when the heat and pressure in the gas generating chamber 24 exceed a predetermined maximum design temperature and pressure resulting from combustion of the pyrotechnic material 26. The heat generated by the burning of the pyrotechnic material 26 contributes to the development of the pressure because the pressure of the combustion gas varies directly with temperature.

Rupture of the combustion gas barrier 34 allows the combustion gas to flow from the gas generating chamber 24 into the mixing chamber 32 through passageway 36 in the downstream wall 29 of the gas generating chamber 24. When the combustion gas flows into mixing chamber 32 it mixes with the stored compressed gas from stored gas chamber 20 which is already in mixing chamber 32. The mixing of the combustion gas and the compressed gas results in a hybrid gas which is adapted for inflating the safety bag.

An outlet means, such as a diffuser 38, is disposed between and is adjacent to the mixing chamber 32 and the safety bag 4, shown in FIGS. 1 and 2, through which outlet means the hybrid gas passes from the mixing chamber 32 to the safety bag 4. Indeed, the outlet means is disposed inside of the safety bag 4, both in the embodiment shown in FIG. 1 and in the embodiment shown in FIG. 2. A separate, removable heat and pressure-sensitive hybrid gas barrier 40 is disposed between the mixing chamber 32 and the outlet means, which in this embodiment is diffuser 38. Prior to actuation of the inflator 2, the hybrid gas barrier 40 prevents the stored compressed gas from entering the outlet diffuser 38 from the mixing chamber 32 through passageway 43. Subsequent to actuation of the inflator 2, the hybrid gas barrier 40 is adapted to act as a secondary barrier and is designed to rupture when the heat and pressure in the mixing chamber 32 exceed a predetermined maximum design temperature and pressure of hybrid gas barrier 40. The hybrid gas barrier 40 is designed to rupture at a pressure which is somewhat less than the pressure at which combustion gas barrier 34 is designed to rupture. Stated another way, the maximum design pressure of combustion gas barrier 34 is higher than the maximum design pressure of hybrid gas barrier 40.

As a result, the hybrid gas barrier 40 ruptures soon after the combustion gas barrier 34. Although there is some definite interval of time between rupture of the combustion gas barrier 34 and rupture of the hybrid gas barrier 40, this time interval is so short that the rupture of hybrid gas barrier 40 may be considered to occur substantially simultaneously with the rupture of combustion gas barrier 34. When hybrid gas barrier 40 ruptures, the hybrid gas passes from mixing chamber 32 into the passageways 42 of the outlet means, diffuser 38, and then the hybrid gas passes to the safety bag 4, shown in FIGS. 1 and 2.

The hybrid gas barrier 40 may have the shape of a thin disc adapted to fit within the circular recess 41 on the interior surface of wall 44 located between the diffuser 38 and the mixing chamber 32. Wall 44 has a passageway 43 therein which is covered and blocked by hybrid gas barrier 40 and which communicates between the mixing chamber 32 and diffuser passageways 42 upon rupture of hybrid gas barrier 40. The combustion gas barrier 34 may also have the shape of a thin disc adapted to fit within the circular recess 45 on the exterior surface of top wall 29 between mixing chamber 32 and combustion gas chamber 24. Both the combustion gas barrier 34 and the hybrid gas barrier 40 are adapted to be replaceable. Thus, after the inflator 2 has been actuated, the ruptured gas barrier 34 may be interchanged with a new combustion gas barrier and the ruptured hybrid gas barrier 40 may be interchanged with a new hybrid gas barrier.

For example, in one embodiment, the hybrid gas barrier 40 and the combustion gas barrier 34 are both made of fully annealed No. 304 stainless steel, which has a melting point in the range of 2550° F. to 2650° F. When the pyrotechnic material 26 is ignited, the heat generated by combustion of the pyrotechnic material 26 is at a temperature of approximately 5400° F. After ignition of the pyrotechnic material 26, this heat is felt by both the combustion gas barrier 34 and the hybrid gas barrier 40. The combustion gas barrier 34 is designed to rupture at approximately 4200 pounds per square inch gage pressure (p.s.i.g.) in the presence of heat after ignition of the pyrotechnic material 26. Prior to ignition of the pyrotechnic material 26, that is, in the absence of heat, the combustion gas barrier 34 is adapted to rupture at approximately 5250 p.s.i.g. The hybrid gas barrier 40 is designed to rupture at approximately 4000 p.s.i.g. in the presence of heat after ignition of the pyrotechnic material 26. Prior to ignition of the pyrotechnic material 26, that is, in the absence of heat, the hybrid gas barrier 40 is designed to rupture at approximately 5250 p.s.i.g. Thus, prior to actuation of the inflator 2, the combustion gas barrier 34 and the hybrid gas barrier 40 are able to withstand the pressure of the stored gas which is in the stored gas chamber 20 and in the mixing chamber 32, the stored gas being under a pressure of approximately 3600 p.s.i.g. But, when the pyrotechnic material 26 is ignited and generates a high pressure hot combustion gas at a temperature of approximately 5400° F. and a pressure above 5000 p.s.i.g., such as 6000 p.s.i.g., the heat and pressure cause the combustion gas barrier 34 to rupture. Almost immediately after the combustion gas barrier 34 ruptures, the hybrid gas barrier 40 also ruptures. The passageway 36 between the gas generating chamber 24 and the mixing chamber 32 may be narrower than the passageway 43 between the mixing chamber 32 and the diffuser 38. Passageway 36 may be 110/1000 of an inch and passageway 43 may be ½ inch. The foregoing data in this example are given by way of illustration. The design of the inflator 2 may be varied to use different temperatures, pressures and size measurements.

The combustion gas barrier 34 may have weak points disposed therein and these weak points are designed to rupture when the heat and pressure exceed a maximum design temperature and pressure. As a result, the entire combustion gas barrier 34 need not rupture, but only the weak points within the barrier. When these weak points rupture, small ports 35 are formed in combustion gas barrier 34. These ports 35 cause the combustion gas to flow at high velocity and direct the combustion gas toward the diffuser 38, rather than toward the stored gas chamber 20.

A strainer 46 may be disposed between the gas generating chamber 24 and the combustion gas barrier 34. This strainer 46 is adapted to allow passage of the combustion gas from the gas generating chamber 24 but to prevent passage of most of the combustion residue resulting from the combustion of the pyrotechnic combustible material 26 from the gas generating chamber 24 to the mixing chamber 32. This strainer 46 thus prevents hot pieces of combustion residue from passing into the inflatable safety bag 4 shown in FIGS. 1 and 2.

The stored gas chamber 20 is defined by curved exterior wall 22 and by interior wall 23. The gas generating chamber 24 is defined by side walls 27, bottom wall 28 and top wall 29. The gas generating chamber 24 may be permanently affixed by its side walls 27 to the interior wall 23 of stored gas chamber 20. In the alternative, the gas generating chamber 24 may be detachably affixed by its side walls 27 to the interior walls 23 of stored gas chamber 20, such as by screw threads (not shown). Such screw threads enable the gas generating chamber 24 to be removed from the interior walls 23 of the stored gas chamber 20, and thus from the inflator 2, for purposes such as replacing the ruptured combustion gas barrier 34 and the ruptured hybrid gas barrier 40 after the inflator 2 has been actuated. As another alternate embodiment, the inflator 2 may be manufactured having an integral common wall formed by walls 23 and 27 between the stored gas chamber 20 and the gas generating chamber 24.

Method

Referring to FIG. 5, the method of this invention is designed for inflating at least one safety bag by use of inflator 2. The method comprises the steps of: filling a stored gas chamber 20 with a compressed gas, the stored gas chamber 20 being in communication with a mixing chamber 32; firing a combustible pyrotechnic material 26 disposed in a closed gas generating chamber 24, the gas generating chamber 24 being separate from the stored gas container 20, upon impact of said vehicle, whereby a combustion gas is generated in the gas generating chamber 24; releasing the generated combustion gas from the gas generating chamber 24 to the mixing chamber 32 by rupturing the combustion gas barrier 34; mixing the combustion gas generated from the combustible pyrotechnic material 26 with the compressed stored gas from the stored gas container 20 in the mixing chamber 32, thereby forming a hybrid gas in the mixing chamber 32 composed of the generated combustion gas and the stored compressed gas; and releasing the hybrid gas directly to an outlet means in communication with the inflatable safety bag 4, shown in FIGS. 1, 2 and 3, by rupturing the hybrid gas barrier 40.

The step of releasing the generated combustion gas and the step of releasing the hybrid gas may be accomplished substantially simultaneously.

Combustion gas passes directly from the gas generating chamber 24 to the mixing chamber 32, then as a component of the hybrid gas, directly from the mixing chamber 32 to the outlet means, such as diffuser 38, and then to the safety bag 4, without passing through the stored gas chamber 20, thereby minimizing the transfer of heat from the combustion gas to the stored gas container 20. When the hybrid gas barrier 40 ruptures, there is a rush of the stored compressed gas from the higher pressure environment in the stored gas chamber 20 to the lower pressure environment in the diffuser 38. This flow of stored compressed gas tends to carry the hot generated gas with it to the diffuser, rather than allowing the generated gas to flow into the stored gas chamber 20.

The step of releasing the generated combustion gas comprises rupturing a combustion gas barrier 34. The step of releasing the hybrid gas comprises rupturing a hybrid gas barrier 40. The combustion gas barrier 34 may have weak points disposed therein and the step of releasing the combustion gas comprises rupturing the combustion gas barrier 34 at these weak points in the barrier. This produces small ports 35 in the combustion gas barrier 34, thereby increasing the velocity of the combustion gas passing through the combustion gas barrier 34 at these ports 35. This increase in velocity of the combustion gas helps to direct the combustion gas into the diffuser 38 and into the inflatable safety bag, rather than into the stored gas chamber 20.

Most of the combustion residue resulting from the combustion of the pyrotechnic combustible material may be prevented from passing from the gas generating chamber 24 to the mixing chamber 32 by use of a strainer 46 disposed between the gas generating chamber 24 and the combustion gas barrier 34.

What is claimed is:

1. A method for inflating at least one safety bag, said method comprising the steps of:
 (a) filling a stored gas zone with a compressed gas, said stored gas zone being in communication with a mixing zone;
 (b) firing a combustible material disposed in a gas generating zone, said gas generating zone being separate from said stored gas zone, upon impact of said vehicle whereby a combustion gas is generated in said gas generating zone;
 (c) releasing said generated combustion gas to said mixing zone;
 (d) mixing said combustion gas with said compressed stored gas in said mixing zone, thereby forming a hybrid gas in said mixing zone composed of said generated combustion gas and said stored compressed gas; and (e) releasing said hybrid gas directly to an outlet in communication with said safety bag; and wherein:

(f) the step of releasing said generated combustion gas and the step of releasing said hybrid gas are accomplished substantially simultaneously; and (g) the step of releasing the combustion gas comprises rupturing a combustion gas barrier at weak points in said barrier, thereby producing small ports in said barrier and increasing the velocity of the combustion gas passing through said ports.

2. An apparatus for inflating at least one safety device, said apparatus comprising:

(a) a stored gas chamber adapted to be filled with a compressed gas;

(b) a gas generating chamber, adjacent to but separate from said stored gas chamber, said gas generating chamber being adapted to contain a combustible material, said combustible material being adapted to generate high pressure combustion gas in said gas generating chamber upon combustion, said gas generating chamber being adapted to contain an actuating means for igniting said combustible material, thereby causing combustion of said combustible material;

(c) a mixing chamber in communication with said stored gas chamber, in which mixing chamber said stored compressed gas and said generated combustion gas are mixed to form a hybrid gas adapted for inflating said safety device;

(d) a combustion gas barrier disposed between said mixing chamber and said gas generating chamber, said combustion gas barrier being adapted to prevent said stored compressed gas from entering said gas generating chamber from said mixing chamber prior to actuation of said combustible material, and being designed to rupture when the heat and pressure in said gas generating chamber exceed a predetermined temperature and pressure of said combustion gas barrier, whereby said combustion gas flows into said mixing chamber;

(e) an outlet means being disposed between and being adjacent to said mixing chamber and said safety device, through which outlet means said hybrid gas passes from said mixing chamber to said safety device; and (f) a hybrid gas barrier disposed between said mixing chamber and said outlet means to prevent said stored compressed gas from entering said outlet means from said mixing chamber prior to actuation of said combustible material, said hybrid gas barrier being adapted to rupture when the heat and pressure in said mixing chamber exceed a predetermined temperature and pressure, whereby said hybrid gas flows through said outlet means and into said safety device; and wherein:

(g) said combustion gas barrier has weak points disposed therein, said weak points being designed to rupture when the heat and pressure in said gas generating chamber exceed a predetermined temperature and pressure; and (h) said combustion gas barrier ruptures only at said weak points and thereby produces small ports in said barrier, thereby increasing the velocity of said combustion gas passing through said ports.

3. A unitary and compact apparatus for inflating at least one safety device, said apparatus comprising:

(a) a stored gas chamber adapted to be filled with a compressed gas, said stored gas chamber disposed around at least part of the outer periphery of said apparatus, said stored gas chamber having walls defining said stored gas chamber, said stored gas chamber adapted to be disposed adjacent to said safety device;

(b) a gas generating chamber disposed in said apparatus adjacent to, inside of, partially contiguous with, but separate from said stored gas chamber and adapted to be disposed in close proximity to said safety bag, said gas generating chamber having walls defining said gas generating chamber, at least one of said walls of said gas generating chamber disposed at least partially contiguous with at least one wall of said stored gas chamber;

(c) a combustible material disposed in said gas generating chamber, said combustible material being adapted to generate a high pressure combustion gas upon combustion;

(d) an actuating means disposed at least partially in said gas generating chamber and adapted to ignite said combustible material;

(e) a mixing chamber disposed in said apparatus, said mixing chamber having walls defining said mixing chamber, at least one of said walls of said mixing chamber disposed at least partially contiguously with said stored gas chamber, said stored gas chamber at least partially surrounding said mixing chamber, said mixing chamber having a passageway through said at least partially contiguous wall between said mixing chamber and said stored gas chamber, the length of said passageway being approximately equal to the total thickness of said wall in the area of said wall where said passageway is located, said mixing chamber thereby being in direct communication with said stored gas chamber, said mixing chamber adapted to be disposed in close proximity to said safety device, said stored compressed gas and said generated combustion gas being mixed in said mixing chamber to form a hybrid gas adapted for inflating said safety device;

(f) a combustion gas barrier disposed between said mixing chamber and said gas generating chamber, said combustion gas barrier being adapted to prevent said stored compressed gas from entering said gas generating chamber from said mixing chamber prior to ignition of said combustible material, said combustion gas barrier having weak points disposed therein, said weak points being designed to rupture to produce gas jet emitting ports in said barrier when the heat and pressure in said gas generating chamber exceed a predetermined temperature and pressure, whereby said combustion gas flows into said mixing chamber;

(g) an outlet means being disposed between and being adjacent to said mixing chamber and said safety device, through which outlet means said hybrid gas passes from said mixing chamber to said safety device; and (h) a hybrid gas barrier disposed between said mixing chamber and said outlet means to prevent said stored compressed gas from entering said outlet means from said mixing chamber prior to actuation of said combustible material, said hybrid gas barrier being adapted to rupture as a result of the heat and pressure in said mixing chamber exceeding a predetermined temperature and pressure, whereby said hybrid gas flows through said outlet means and into said safety device.

* * * * *